INVENTOR.
LESLIE M. FORSYTH

INVENTOR.
LESLIE M. FORSYTH

Feb. 17, 1970  L. M. FORSYTH  3,496,354
RADIOGRAPHIC X-RAY TUBE STAND AND STEREOSHIFT MECHANISM
EMPLOYING A HYPOCYCLOIDAL PLANETARY GEAR DRIVE
Filed Sept. 28, 1966  5 Sheets-Sheet 4

INVENTOR.
LESLIE M. FORSYTH
By

Feb. 17, 1970                     L. M. FORSYTH                        3,496,354
              RADIOGRAPHIC X-RAY TUBE STAND AND STEREOSHIFT MECHANISM
                   EMPLOYING A HYPOCYCLOIDAL PLANETARY GEAR DRIVE
Filed Sept. 28, 1966                                         5 Sheets-Sheet 5
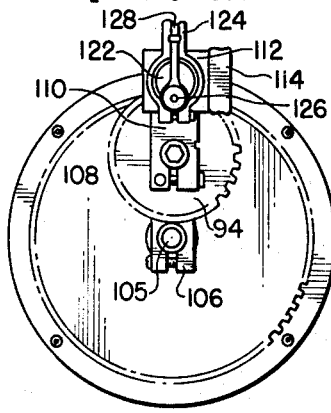
FIG. 6
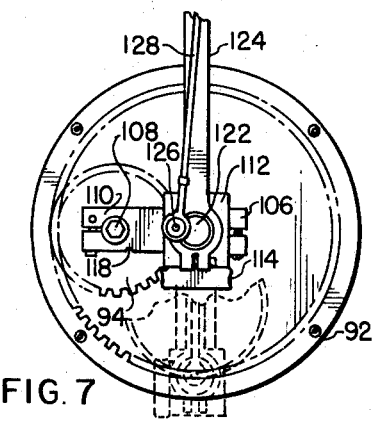
FIG. 7
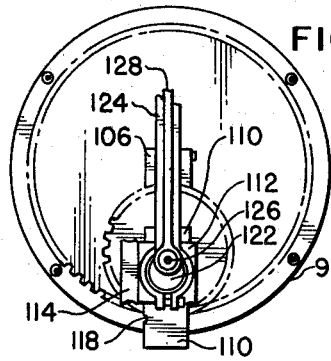
FIG. 8
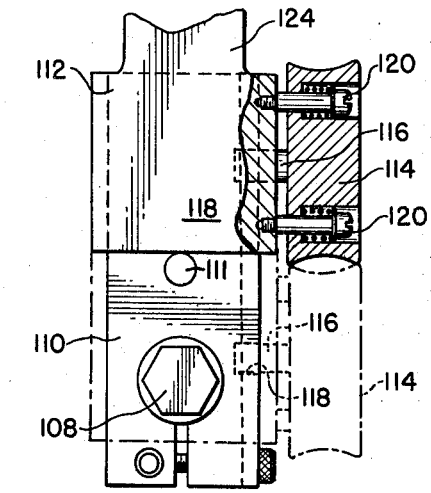
FIG. 9
FIG. 10
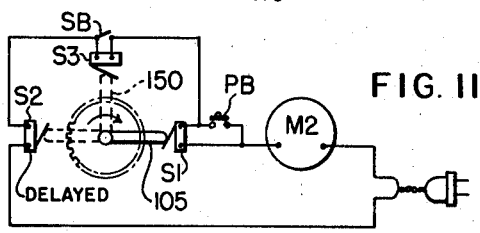
FIG. 11
INVENTOR.
LESLIE M. FORSYTH
BY
  Norman Gerlach
       atty.

United States Patent Office 3,496,354
Patented Feb. 17, 1970

3,496,354
RADIOGRAPHIC X-RAY TUBE STAND AND STEREOSHIFT MECHANISM EMPLOYING A HYPOCYCLOIDAL PLANETARY GEAR DRIVE
Leslie M. Forsyth, 7944 W. Strong St., Norridge, Ill. 60656
Filed Sept. 28, 1966, Ser. No. 582,574
Int. Cl. G01n 23/04; H01j 37/22
U.S. Cl. 250—61                                    7 Claims

ABSTRACT OF THE DISCLOSURE

A stereoscopic apparatus for positioning an X-ray tubehead with respect to a remotely placed vertically shiftable film holder comprises a tube stand having a fixed framework, a main carriage slidable vertically on the framework, a second carriage mounted on the main carriage for independent vertical sliding motion, an X-ray tubehead mounted on the secondary carriage for limited fore and aft rocking movement, and a power-operated stereoshift mechanism which simultaneously effects such sliding and rocking motion. The stereoshift mechanism includes a hypocycloidal planetary gear system that provides smooth mechanical operation and convenient tubehead control.

---

The present invention relates generally to improvements in radiographic apparatus and has particular reference to an electrically operated X-ray tube stand in which novel facilities or means are provided for the selective making of stereoscopic exposures, either at long range or at short range. The stereoshift mechanism by means of which this is made possible is applicable to a wide variety of X-ray emission apparatus other than tube stands, but for exemplary purposes, the stereoshift mechanism of the present invention is illustrated in connection with a tube stand which is in the form of a slave or follow-up unit in that it operates automatically under the control of the manipulations of a remote exposure apparatus with which it is electrically coordinated.

The objects and advantages of the present invention may best be appreciated from a consideration of the following brief description of the involved mechanism. Accordingly, the present radiographic X-ray tube stand includes the usual vertical supporting standards which serve slidably to support a main carriage on which the X-ray tubehead and its associated stereoshift mechanism are mounted and with which the tubehead and stereoshift mechanism move bodily as a unit. Vertical up and down movements of the main carriage are effected under the control of a reversible electric motor which drives a vertically disposed lead screw in opposite directions in order to raise or lower the main carriage and thus bring the tubehead to the desired level. Selective energization of the motor for either upward or downward movements of the main carriage may be accomplished by manual control means utilizing a reversing switch if desired, but in the illustrated form of the invention, the motor preferably is selectively energized under the control of an electrical bridge circuit which is operatively related to the associated exposure apparatus and by means of which the vertical movements of the tubehead-supporting main carriage is caused to follow the up and down movements of the exposure apparatus. This bridge circuit constitutes the subject matter of my copending United States patent application Ser. No. 582,398, filed on Sept. 27, 1966, and entitled "Radiographic Apparatus Employing Balanced Electrical Bridge Circuit Means to Coordinate the Movements of Cooperating X-Ray Film and X-Ray Tubehead Holders."

Slidably mounted on the main carriage for independent vertical up and down movements with respect thereto is a secondary carriage, the tubehead being mounted for rocking movement on the latter carriage. The stereoshift mechanism which, as previously stated, is mounted on the main carriage, involves a hypocycloidal gear arrangement including a fixed circular ring gear and an inner revolvable planet gear, the revolution of which is effected by an eccentric crank arm on the output shaft of a gear reduction device, the latter being driven by a second electric motor. Three limit switches are disposed in series in the motor circuit so that opening of any one of them will open the motor circuit and terminate operation of the second motor. These limit switches are successively operable as the output shaft of the gear reduction device rotates to stop the movement of the planet gear and thus locate the matter in its uppermost or 0° position with respect to the ring gear, an intermediate or 90° position, or its lowermost or 180° position. A second eccentric crank arm on the planet gear is connected by a first link to the main carriage. The number of teeth on the planet gear is equal to one-fourth of the number of teeth on the ring gear, and thus, when the planet gear is in its uppermost 0° position, the two crank arms are in alignment and their combined linear extent is effective to maintain the main carriage in its fully elevated position. Similarly, when the planet gear is in its lowermost 180° position, the two crank arms are in alignment and their combined linear extent is effective to maintain the main carriage in its fully lowered position. However, when the planet gear is in its intermediate 90° position, the two crank arms are in a reentrant or "doubled back" position so that the main carriage is maintained in a central or intermediate position half-way between its upper and lower positions.

The purpose of providing the above described carriage-positioning mechanism is, of course, to position the tubehead in an elevated position for a first exposure of the X-ray film at the remote location and, thereafter, to position the tubehead in a lowered position for the second or stereo exposure. The intermediate position of the carriage is employed when single non-stereo exposures are resorted to or desired.

An additional and important feature of the present invention resides in the provision of a means whereby the "throw" of the secondary tubehead-supporting carriage may be adjusted as between its uppermost and its lowermost positions to the end that two automatic but different length stereoshifts are available, such, for example, as a seven-inch shift for a large 14″ x 17″ film at a seventy-two inch distance, and a four-inch shift for a smaller 10″ x 12″ film at a forty-inch distance. This adjustment for "throw" is attained by varying the effective length of the second eccentric crank arm on the planet gear, a compound telescopic crank arm being provided with means whereby two settings thereof are available.

A still further important feature of the invention resides in the provision of an automatic means for rocking the tubehead with respect to the secondary carriage, the extent of rocking movement being commensurate with the vertical "throw" of the latter. This is accomplished by the provision of a second link, one end of which is connected by a crank arm of small eccentricity to the outer end of the adjacent or second crank arm, and the other end of which link is connected to the rocker cradle which supports the tubehead. Thus, as the hypocycloidal gear arrangement goes into operation, small degrees of harmonic rocking movement are applied to this rocker cradle which are commensurate in oscillatory amplitude to the reciprocatory amplitude of motion of the secondary carriage. The purpose of this rocking movement of the tubehead is, of course, to maintain the X-ray beam centered with respect to films of different sizes and different exposure distances.

Numerous other ancillary advantages of the invention accrue from certain novel features of design which, when considered collectively, provide a radiographic apparatus which is extremely smooth and silient in its operation, rugged and durable so that it will withstand rough usage, and attractive in its appearance and design. For example, a novel means for counterbalancing the tubehead-supporting secondary carriage without interfering with the rocking movement of the tubehead or the raising or lowering of the main carriage contributes largely to the over-all efficiency of operation of the particular radiographic X-ray apparatus or tube stand constituting the present invention.

In the accompanying five sheets of drawings forming a part of this specification, one illustrative embodiment of the invention is shown.

In these drawings:

FIG. 6 is a fragmentary front elevational view of the hypocycloidal gear arrangement which is employed in connection with the present invention to control the stereo movements of the tubehead-supporting secondary carriage;

FIGS. 7 and 8 are front elevational views similar to FIG. 6, but showing the parts in different positions;

FIG. 9 is an enlarged fragmentary vertical sectional view taken on the line 9—9 of FIG. 4;

FIG. 10 is an enlarged fragmentary sectional view taken on the line 10—10 of FIG. 5; and FIG. 11 is a simplified circuit diagram, entirely schematic in its representation, illustrating the principles of a local motor control circuit that may be employed in connection with the present invention.

Figure 1:
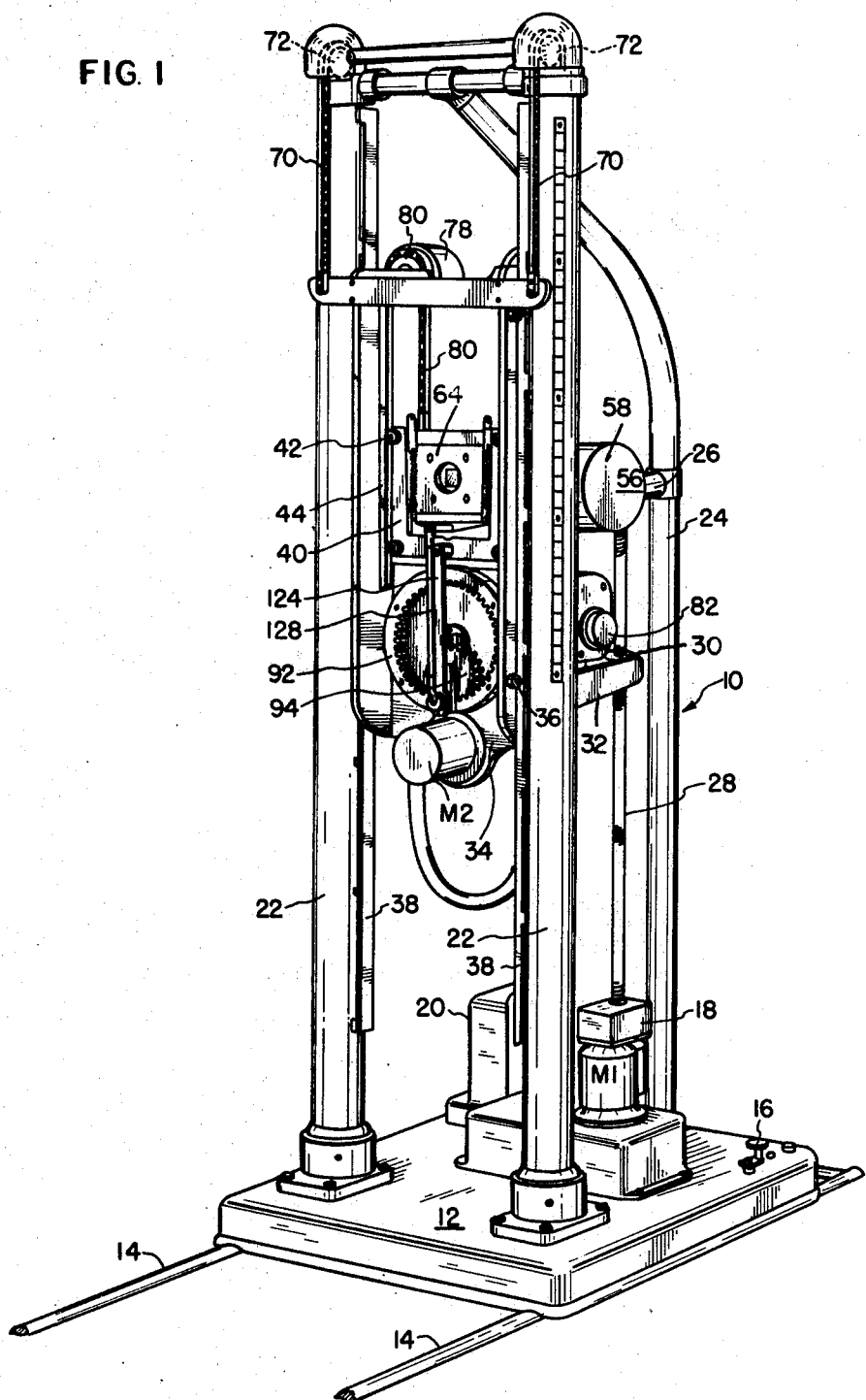
FIG. 1 is a front perspective view of a radiographic tube stand embodying the principles of the present invention.
Figure 2:
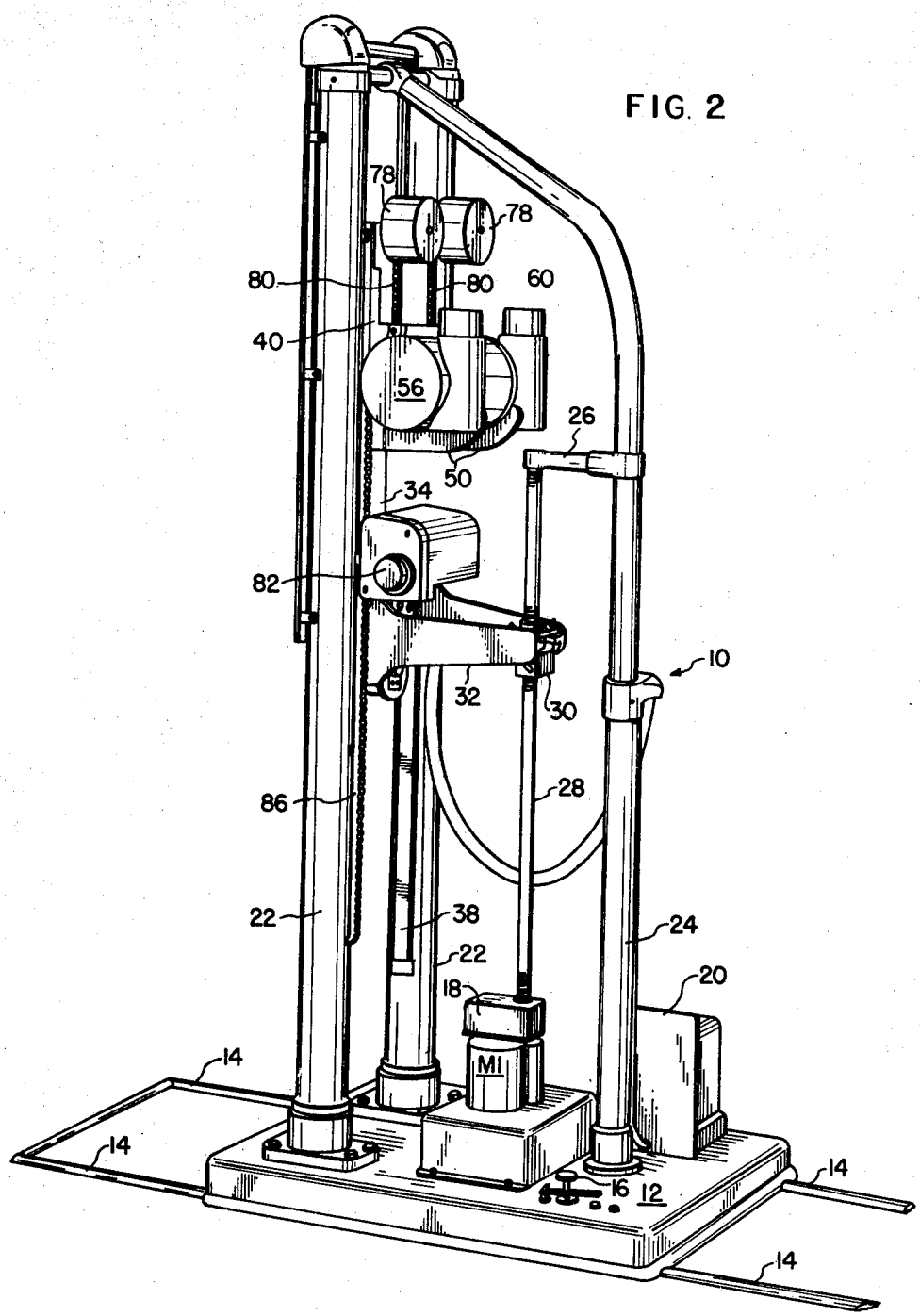
FIG. 2 is a rear perspective view of the improved tube stand.

Referring now to the drawings in detail and in particular to FIGS. 1 and 2, a tube stand embodying the principles of the present invention is designated in its entirety by the reference numeral 10. Briefly, the tube stand involves in its general organization a base platform 12 which is horizontally slidable on a pair of spaced apart rails 14 toward and away from a counterpart radiographic component (not shown), such, for example, as a film holder stand having provision for vertical adjustment of the film holder proper. A locking knib 16 is provided for the purpose of securing the platform at selected positions along the rails 14. Mounted on the platform 12 is an electric motor M1, an associated gear reduction device 18, and an amplifier 20, the nature and function of which will be set forth presently.

Two laterally spaced, hollow, supporting columns or standards 22 extend upwardly from the platform 12 and are steadied at their upper ends by means of an arched upwardly extending strut tube 24, from which there extends forwardly a bracket 26. A feed vertical screw 28 of small thread pitch extends between the gear reduction device and the distal end of the bracket 26 and receives thereover a nut 30. The latter is attached to two lift arms 32 which project rearwardly from the lower edge region of a vertically shiftable main carriage 34 (see also FIGS. 4 and 5 as well as FIGS. 1 and 2).

Figure 3:
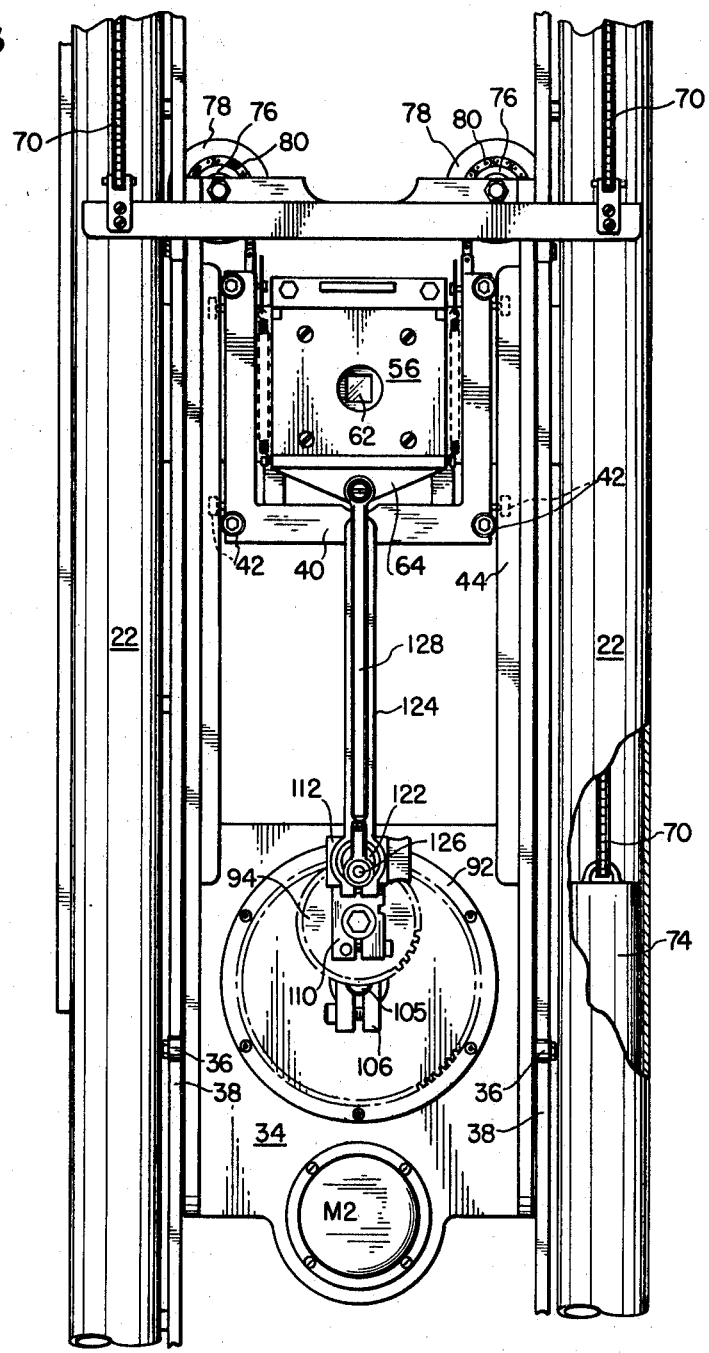
FIG. 3 is a fragmentary front elevational view of the tube stand, the view being taken in the vicinity of the tubehead-supporting secondary carriage.

The carriage 34 is vertically shiftable on the standards 22 and is guided by rollers 36 on opposed vertically extending rails 38 on the standards. Slidable vertically within the main carriage 34 is a secondary X-ray tube-supporting carriage 40 which is guided by rollers 42 (see FIG. 3) in vertical spaced apart channels 44 on the main carriage 34. From the above description, it will be apparent that the main carriage 34 is vertically shiftable on the standards 22, while the secondary carriage 40 is vertically shiftable within the main carriage. The two vertical standards 22 and their reinforcing strut tube 24 constitute, in effect, a fixed framework on which the main carriage 34 with its contained secondary tubehead-supporting carriage 40 is vertically shiftable to accommodate changes in the elevation of the remotely disposed film holder.

In the upper region of the secondary carriage 40, two rearwardly projecting cradle arms 50 (see FIGS. 5 and 9) carry rollers 52 on which there is rockably supported a rigid cradle 54 within which there is secured an X-ray tubehead 56. The tubehead includes the usual cylindrical X-ray tube proper 58, high voltage electrode mounts 60, and the usual front cone 62 which is secured to a front plate 64. The entire tubehead with its attached front plate 64 is thus capable of limited rocking movement in a fore and aft direction within the secondary carriage 40 for the purpose of maintaining the X-ray beam centered on the X-ray film at all times during use of the present radiographic apparatus or tube stand. As will be described subsequently, novel means are provided for automatically controlling this rocking movement of the tubehead and its adjuncts when stereoshifts are desired.

The vertical movements of the main carriage 34 are stabilized and the carriage is counterbalanced by two spaced apart chains 70 which pass over pulleys 72 at the upper ends of the standards 22 and carry weights 74 (see FIG. 3) within the hollow tubular standards 22. The vertical, as well as the rocking, movements of the secondary carriage 40 are stabilized and counterbalanced by torsion springs 76 which are contained within spring housings 78 and are connected to the carriage by chain and sprocket devices 80.

Figure 4:
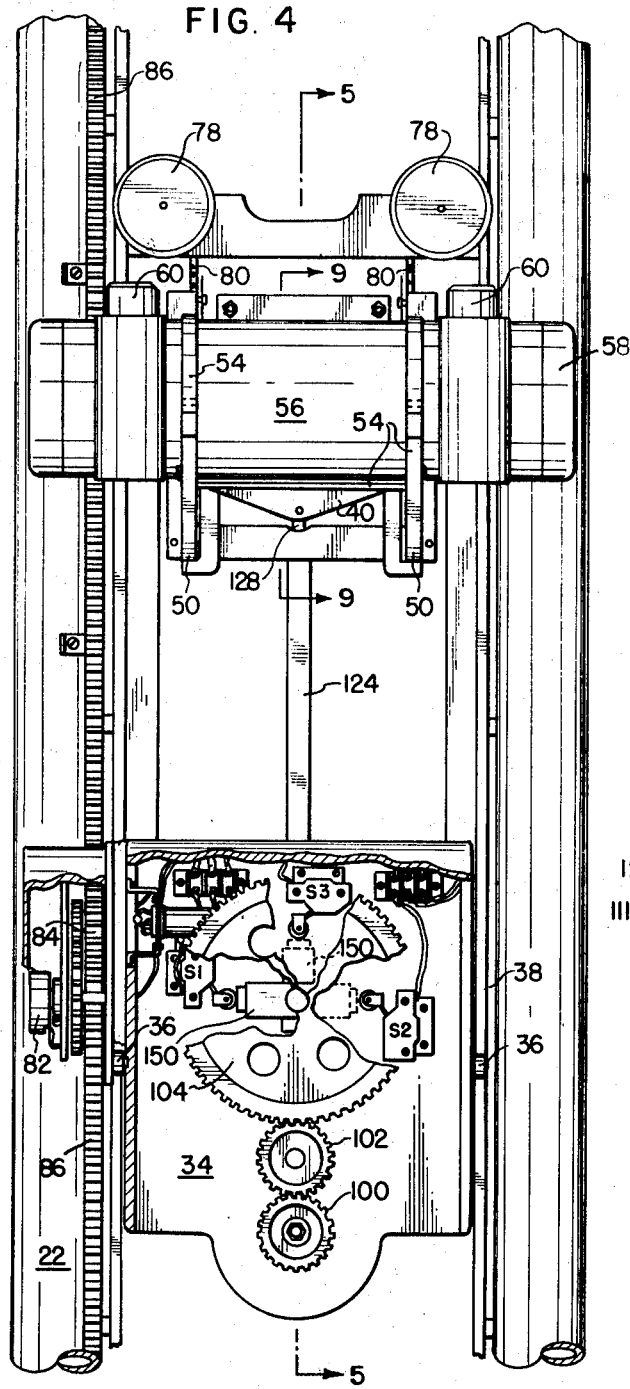
FIG. 4 is a rear elevational view of the structure shown in FIG. 3 with certain parts being broken away in order more clearly to reveal the nature of the invention.

Vertical movements of the main carriage are effected under the control of the motor M1 and its associated vertical feed screw 28. The motor M1 is electrically controlled under the influence of vertical displacements of the film holder that is associated with the remote but associated exposure apparatus (not shown). The electrical controls constitute no part of the present invention and for a full disclosure thereof reference may be had to my previously mentioned copending patent application Ser. No. 582,398. In FIG. 4, certain mechanical aspects of the electrical control system for the motor M1 are disclosed and it is deemed sufficient for descriptive purposes herein to state that a potentiometer 82 which is mounted on and moves bodily with the main carriage 34 has a counterpart potentiometer (not shown) on the film holder of the associated exposure apparatus, and the two potentiometers establish a bridge circuit which, when balanced, creates a condition of null balance in the amplifier 20. The stems of both potentiometers are rotatable in timed relation to their respective vertically movable components, the potentiometer 82 disclosed herein being connected through a train of gearing 84 to a vertically disposed fixed rack 86 on one of the standards 22. The ohmic values of the two potentiometers and the involved gear ratios are the same on both movable components so that when the tubehead is displaced in one direction or the other from the level of the X-ray film, a signal of one polarity or the other is transmitted to the amplifier 20 and relay circuitry is set into action to actuate the electric motor M1 in a direction to restore the level of the main tubehead-supporting carriage to a position where the level of the tubehead matches that of the film holder of the associated exposure apparatus, all in the manner shown and described in my aforementioned copending patent application Ser. No. 582,398.

The novelty of the present invention resides largely in a gearing arrangement which, by a hypocycloidal gear arrangement which is installed on and movable bodily with the main carriage 34, serves to effect the vertical shifting movements of the secondary X-ray tube-supporting carriage 40, as well as the fore and aft rocking movements of the tube-supporting cradle 54 and the tubehead 56 that is carried therein. This gearing arrangement is best illustrated in FIGS. 1, 3, 4 and 5 while various positions thereof are shown in FIGS. 6, 7 and 8. Fixedly supported within an enlarged boss 90 (see FIG. 5) on the main carriage 34 is a ring gear 92 within which there revolves about its own central axis a planet gear 94, the latter rotating tractionally as it revolves. The number of internal teeth on the ring gear 92 is two times the number of external teeth on the planet gear 94 or, in other words, the pitch diameter of the ring gear is twice that of the planet gear in order to insure proper planet gear orientation at certain static positions that are assumed thereby during actual X-ray exposures as will be described subsequently. Revolution of the planet gear 94 bodily about the axis of the ring gear 92 takes place in a counterclockwise direction as viewed in FIGS. 4, 6, 7 and 8, while independent rotation of the planet gear 94 about its own revolving axis takes place in a clockwise direction. Means are provided for stopping the planet gear at the 0°, 90° and 180° points on the ring gear, reading in a counterclockwise direction or, in other words, at the twelve, nine and six o'clock points of the ring gear.

The planet gear 94 is revolved under the control of an electric motor M2 which is mounted on the front face of the main carriage 34 near the lower edge of the latter and has a horizontal motor shaft 96 which projects through the carriage and is connected by a power train to the planet gear 94. This power train may be of any suitable type such as a series of side-by-side belts and pulleys, but for illustrative purposes herein, the power train is shown as being in the form of gearing including a driving gear 100, a driven gear 104, and an intermediate idler gear 102. The driven gear 104 is carried on a horizontal sun shaft 105 which projects forwardly through the main carriage 34 and is coaxial with the fixed ring gear 92. The sun shaft 105 carries a first radial crank arm 106 which, in turn, carries a crank pin 108 on which the planet gear 94 is rotatably mounted. Forwardly of the planet gear 94 the crank pin 108 carries for swinging movement thereon an extensible and contractible crank arm assembly including a second crank arm 110 proper having thereon a slide member 112 (see FIG. 10) which is movable between an outer position near the distal end of the crank arm 110 and an inner position near the proximate end of said arm. The crank arm proper 110 is constrained at all times to follow the rotary and orbital movements of the planet gear 94 to which it is connected by a pin 111. The slide member 112 is capable of being locked in either position by means of a detent fingerpiece 114 having a detent stud 116 which is selectively receivable in a pair of notches 118. The latter are formed in the adjacent side of the crank arm 110. Spring-biasing assemblies 120 serve to bias the fingerpiece 114 in a direction to maintain the detent stud 116 in the selected notch 118.

The slide block 112 is provided with a forwardly projecting horizontal stub shaft 122 which constitutes a second crank arm and to which there is pivotally connected the lower end of a carriage-reciprocating link 124, the upper end of such link being pivoted to the lower end of the secondary X-ray tube-supporting carriage 40. The stub shaft 122 carries a small eccentric pin 126 to which there is pivotally connected the lower end of a second and tubehead-oscillating link 128. The upper end of said link is pivoted to the front plate 64 of the tubehead.

In the operation of the hypocycloidal gear mechanism by means of which the secondary carriage may be shifted between a raised and a lowered position for stereo purposes, the crank arm assembly including the crank arm proper 110 and its asociated slide block may be adjusted for maximum "throw" of the secondary carriage 40 so that, when attaining stereo effects in connection with a large 14" x 17" X-ray film, the amplitude of shifting movement of the carriage 40 will be seven inches, the adjustment being made by pulling the fingerpiece 114 outwardly away from the slide block 112 to release the latter and allow the same to be slid to a position near the distal end of the crank arm 110, after which release of the fingerpiece will allow the detent stud 116 to fall into the outermost notch 118. Alternatively, the crank arm assembly may be adjusted for minimum "throw" of the secondary carriage 40 to accommodate a smaller 10" x 12" X-ray film by similarly manipulating the fingerpiece 114 to cause the detent stud 116 to enter the inner notch 118 on the crank arm 110, whereupon the amplitude of shifting movement of the carriage will be shorter than the aforementioned seven inches, for example, four inches which will accommodate the decreased width of the smaller 10" x 12" X-ray film.

From the above description, it will be seen that when the slide member 112 is locked in its outer position of maximum carriage oscillation in order to accommodate the larger size X-ray film, continuous rotation of the sun shaft 105 will cause a rolling motion of the planet gear 94 around the inside toothed surface of the ring gear 92 and the stub shaft or crank arm 122 which lies near the periphery of the planet gear will reciprocate vertically in a straight line between the position in which it is shown in FIG. 6 and the position in which it is shown in dotted lines in FIG. 7. As a consequence, the carriage-reciprocating link 124 will remain in a vertical position from which it does not deviate. Its vertical movements will carry it onto coincidence with the axis of the sun shaft 105 twice during each complete cycle of reciprocation, once during the down stroke and once during the up stroke of the carriage 40.

The rotary movement of the motor-driven crank arm 106 controls the revolving movements of the planet gear 94 in its orbital path within the confines of the ring gear 92. Means are provided for stopping such movements of the planet gear in any one of three predetermined positions, namely, the 0° or twelve o'clock position shown in FIG. 6; the 180° or six o'clock position shown in dotted lines in FIG. 7; and the 270° or nine o'clock position shown in full lines in FIG. 7. The first two mentioned positions are illustrative of the stereoshift positions of the hypocyclodial gear ararngement when large size X-ray films are exposed. The third mentioned position is illustrative of the gear arrangement when a non-stereo exposure of either a large size or a small size film is made and the X-ray tube is centered on the film. The position of the parts shown in FIG. 8 is representative of the 180° or six o'clock position of the planet gear 94 with the associated parts being adjusted for small carriage oscillation and consequent accommodation of small size X-ray films for stereo exposure.

It will be observed that in the position of the parts as shown in FIG. 6, the two crank arms 106 and 110 which turn in opposite directions during orbiting of the planet gear 94 are in effective vertical alignment, albeit, in different planes, so that the uppermost position of the secondary carriage 40 is a function of the combined lengths of these two crank arms. Similarly, in the position of the parts as shown in dotted lines in FIG. 7, the crank arms 106 and 110 are in effective vertical alignment so that the lowermost position of the secondary carriage is a function of the combined lengths of the crank arms. In the 270° or nine o'clock position of the parts as shown in full lines in FIG. 7, the two crank arms overlie each other so that their combined effective length is determined by a subtracting operation. Since the two crank arms are equal in length, the remainder of the subtracting operation is zero and, therefore, the stub shaft 122 will lie on the center of the ring gear and the secondary carriage 40 will assume a mid-position with respect to the main carriage 34 where non-stereo exposure of either the large size or the small size X-ray film will result with the X-ray beam being centered with respect to the film. This central position of the stub shaft 122 is a result of the collapsing of the two crank arms 106 and 110 in elbow joint fashion until the two arms are substantially coincident.

Figure 5:
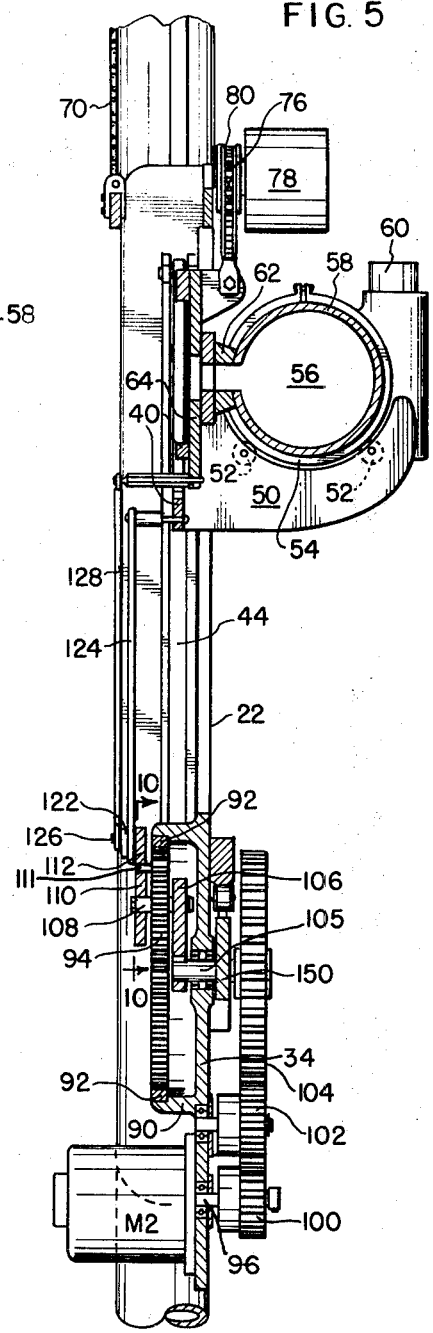
FIG. 5 is a vertical sectional view taken on the line 5—5 of FIG. 4.

As previously stated, means are provided for electrically controlling the three positions of the planet gear 94, or in other words, stopping the operation of the electric motor M2 precisely at such time as the planet gear 94 arrives at the desired position within the ring gear 92. Such control means is operable by depressing a push button shown at PB in FIG. 11, the push button being located at an appropriate point on the film holder component of the associated exposure apparatus. As shown in FIGS. 4, 5 and 11, a radial sweep arm 150 is mounted on the sun shaft 105 and is designed for successive engagement with three normally closed limit switches S1, S2 and S3. Engagement of any given switch by the sweep arm 150 will open the normally closed contacts of such switch. The three switches are disposed electrically in series in the circuit for the motor M2 and the push button PB is disposed in a shunt circuit so that whenever it is depressed, the motor M2 will be energized. If the push button is depressed for a prolonged period of time, the planet gear 94 will revolve continuously within the ring gear 92. Such continuous movement of the planet gear is, however, never resorted to in actual X-ray work, but may be resorted to when testing the functioning of the equipment. The switch S2 is a delayed action switch wherein after an initial opening of the contacts thereof, there will be a short period of elapsed time, and thereafter, the contacts will again become closed to energize the motor M2. A manual bridge switch SB is disposed in shunt relation with respect to the switch S3 so that the function of the latter switch may be dispensed with during stereo operation of the apparatus.

From the above description, it will be apparent that the push button PB may initially be depressed to energize the motor M2 and cause clockwise rotation of the sweep arm 150 as viewed in FIG. 11. At some period of time when the revolving planet gear 94 is observed by the operator to be approaching its uppermost or twelve o'clock position, the push button will be released and the three normally closed switches S1, S2 and S3 will maintain the motor energized until the planet gear arrives precisely at its twelve o'clock position. At this time, the sweep arm 150 will engage the switch S1 and open the contacts thereof, thus stopping the motor M2 and causing the planet gear to remain at its uppermost position wherein the secondary carriage 40 will be fully elevated with respect to the main carriage 34. At this time, an upper stereo exposure is made. Thereafter, the operator will again depress the push button PB momentarily to restart the motor M2 and the three normally closed switches will maintain the motor in operation until the sweep arm 150 engages the switch S2 and closes the contacts thereof, thus stopping the planet gear 94 in its lowermost or six o'clock position wherein the secondary carriage 40 is in its lowermost position with respect to the main carriage 34. At this time, the second stereo exposure is made. Shortly after the second stereo exposure is made, the delayed action contacts of the switch S2 will automatically close and the motor M2 will return the planet gear 94 to its initial uppermost position, thus again elevating the secondary carriage 40 for the next stereo operation on a succeeding X-ray film. The bridge switch SB, having previously being closed, passage of the sweep arm across the switch S3 will be without effect.

When stereo exposures are to be dispensed with, the bridge switch SB will be opened and the operator will manipulate the push button PB to bring the sweep arm to the position wherein it is shown in dotted lines in FIG. 11 and engages the switch S3 and opens the contacts thereof, thus terminating the movement of the planet gear 94 at its 270° or nine o'clock position. As previously set forth, in this position of the planet gear, the X-ray beam emanating from the tubehead 56 will be directed toward the center of the X-ray film that is carried by the remote film holder regardless of the particular size film undergoing exposure.

It will be understood that the above described hypocycloidal gear stereoshift mechanism is effective at any adjusted level of the main carriage 34 and that the mechanisms for raising and lowering the main carriage is entirely independent from the mechanism for raising and lowering the secondary carriage 40 within the main carriage. Main carriage movements are possible at any time, regardless of the position of the secondary carriage and the reverse also is true. As is disclosed in my copending patent application Ser. No. 582,398, above referred to, at any time that the operator effects a manual raising or lowering of the associated but remotely positioned film holder, the main carriage 34 of the tube stand 10 will follow such movements under the influence of the servo mechanism which forms the subject matter of said copending application. Then, in any adjusted position of both radiographic components (film holder and tubehead), an upper stereo exposure may be made, followed by momentary depression of the push button PB. Such depression of the push button initiates lowering of the secondary carriage 40 to a position where the second and lower stereo exposure may be made. After such second exposure is made, the time delay switch S3 will close its contents to initiate automatic return of the secondary carriage 40 to its upper or initial position ready for the next stereo exposure operation. During both the upward and downward stereo movements of the secondary carriage 40, the link 128 and its associated eccentric pin 126 will cause the tubehead-supporting cradle 54 to rock slightly in one direction or the other in order to maintain the X-ray beam centered on the X-ray film. The manual setting of the slide block 112 by means of the fingerpiece 114 will determine the amplitude of the rocking movement involved.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the acompanying claims is the same to be limited. For example, the specific control mechanism for initiating stereoshift operations as exemplified in FIG. 11 is merely an exemplary control mechanism which may be employed if desired and which, in reality, is a simplified equivalent circuit diagram evolved from a more elaborate control mechanism involving the use of electronically-controlled relay circuitry.

Having thus described the invention what I claim as new and desire to secure by Letters Patent is:

1. A stereoscopic apparatus for positioning an X-ray tubehead with respect to a remotely positioned vertically shiftable film holder and comprising a tube stand having a fixed framework, a main carriage slidable vertically on said framework, a secondary carriage mounted for independent vertical sliding movement of said main carriage, an X-ray tubehead mounted for limited fore and aft rocking movement on said secondary carriage, and power-operated stereoshift mechanism for simultaneously effecting such sliding and rocking movement, said stereoshift mechanism including a horizontal sun shaft mounted for rotation on said main carriage, a ring gear concentric with said sun shaft, a radial crank arm on said sun shaft, a first eccentric crank pin on said crank arm, a planet gear rotatably mounted on said crank pin for orbital tractional movement in one direction within the ring gear and consequent rotation in the opposite direction, the pitch diameter of said ring gear being twice the pitch diameter of said planet gear, a second crank pin eccentrically carried by said planet gear, and a link connecting said second crank pin to the secondary carriage.

2. A stereoscopic apparatus as set forth in claim 1 and wherein said stereoshift mechanism further includes means for effecting rocking movements of the tubehead in timed relation with vertical movements of the second carriage with respect to the main carriage, and said means comprises a third ecentric crank pin on said second crank pin, and a second link connecting said third eccentric crank pin and the tubehead.

3. A stereoscopic apparatus as set forth in claim 1 and wherein there is included manual means for varying the eccentricity of said second crank pin between an outer position wherein it lies on the periphery of said planet gear, and an inner position wherein it lies within the peripheral confines of the planet gear, whereby when said second crank pin is in its outer position it is constrained to reciprocate in a vertical plane, and when it is in its inner position it is constrained to oscillate about the axis of said sun shaft.

4. A stereoscopic apparatus as set forth in claim 2 and including, additionally, an electric motor mounted on said main carriage and operatively connected to said sun shaft in driving relationship, a normally closed electric circuit for said motor, and means effective under the control of the rotation of said crank arm for opening said motor circuit when said first crank arm assumes either of the vertical positions of which it is capable of assuming.

5. A stereoscopic apparatus as set forth in claim 4 and wherein said means for opening said motor circuit comprises a radial sweep arm on said sun shaft, and a pair of normally closed switches positioned in the path of movement of said sweep arm, electrically connected in series in the motor circuit, and individually effective to become open to thus open the motor circuit when engaged by said sweep arm.

6. A stereoscopic apparatus as set forth in claim 5 and including, additionally, means for automatically closing one of said switches after a predetermined period of time has elapsed after opening thereof by said sweep arm.

7. A stereoscopic apparatus as set forth in claim 2 and including, additionally, an electric motor mounted on said main carriage and operatively connected to said sun shaft in driving relationship, a normally closed electric circuit for said motor, a radial sweep arm on said sun shaft, and a series of three normally closed switches positioned in the path of movement of said sweep arm, electrically connected in said motor circuit and individually effective to become open to thus open the motor circuit when engaged by said sweep arm, the circumferential disposition of said switches being such that they are successively engaged by the sweep arm when the crank arm assumes either a vertical or a horizontal position.

References Cited

UNITED STATES PATENTS

| 1,895,546 | 1/1933 | Kelley | 250—61 |
| 2,046,543 | 7/1936 | Boldingh | 250—61 |
| 2,518,884 | 8/1950 | Guentner et al. | 250—61 |
| 2,592,496 | 4/1952 | Vigh | 250—92 |

RALPH G. NILSON, Primary Examiner

C. E. CHURCH, Assistant Examiner

U.S. Cl. X.R.

250—92